(12) United States Patent
Ceragioli et al.

(10) Patent No.: US 8,631,134 B2
(45) Date of Patent: Jan. 14, 2014

(54) NETWORK ARCHITECTURE FOR SECURE DATA COMMUNICATIONS

(75) Inventors: Dennis M. Ceragioli, Pittsburg, CA (US); Melvin Jeyaraj, Gorham, ME (US)

(73) Assignee: Visa U.S.A. Inc., San Francisco, CA (US)

(*) Notice: Subject to any disclaimer, the term of this patent is extended or adjusted under 35 U.S.C. 154(b) by 447 days.

(21) Appl. No.: 12/182,613

(22) Filed: Jul. 30, 2008

(65) Prior Publication Data
US 2010/0030839 A1 Feb. 4, 2010

(51) Int. Cl.
G06F 15/16 (2006.01)
G06F 15/173 (2006.01)

(52) U.S. Cl.
USPC .......... 709/227; 709/201; 709/225; 709/238; 709/245

(58) Field of Classification Search
USPC .......................... 709/201, 225, 227, 238, 245
See application file for complete search history.

(56) References Cited

U.S. PATENT DOCUMENTS

| | | | |
|---|---|---|---|
| 5,778,174 A | 7/1998 | Cain | |
| 6,104,716 A | 8/2000 | Crichton et al. | |
| 6,505,193 B1* | 1/2003 | Musgrave et al. | 1/1 |
| 7,333,990 B1* | 2/2008 | Thiagarajan et al. | 1/1 |
| 2003/0191970 A1* | 10/2003 | Devine et al. | 713/201 |
| 2004/0006615 A1* | 1/2004 | Jackson | 709/223 |
| 2004/0088424 A1* | 5/2004 | Park et al. | 709/229 |
| 2005/0144463 A1 | 6/2005 | Rossebo | |
| 2005/0265327 A1 | 12/2005 | Buch et al. | |
| 2006/0143189 A1* | 6/2006 | Imaeda et al. | 707/100 |
| 2006/0212700 A1 | 9/2006 | Zhang | |
| 2006/0242322 A1 | 10/2006 | Williams | |
| 2009/0013399 A1* | 1/2009 | Cottrell et al. | 726/12 |
| 2009/0049173 A1* | 2/2009 | Pulito et al. | 709/226 |
| 2009/0172163 A1* | 7/2009 | Carroll et al. | 709/226 |

FOREIGN PATENT DOCUMENTS

| | | |
|---|---|---|
| RU | 2004130424 A | 7/2005 |
| RU | 2317646 C2 | 2/2008 |
| RU | 2007139515 A | 4/2009 |

OTHER PUBLICATIONS

Freudenthal, E.; Port, L.; Pesin, T.; Keenan, E.; Karamcheti, V., "Switchboard: secure, monitored connections for client-server communication," Distributed Computing Systems Workshops, 2002. Proceedings. 22nd International Conference on , vol., no., pp. 660,665, 2002.*

(Continued)

Primary Examiner — Jeffrey R Swearingen
Assistant Examiner — Taylor Elfervig
(74) Attorney, Agent, or Firm — Kilpatrick Townsend & Stockton LLP

(57) ABSTRACT

A network architecture includes a perimeter network connected between an internal network and an external network. The perimeter network includes one or more external edge nodes that are connected to the external network and a plurality of proxy servers that are each connected to one or more of the external edge nodes. One or more internal edge nodes are connected between the plurality of proxy servers and the internal network. The proxy servers are operable to establish a first secure connection between a destination through the external network and a second secure connection to a destination in the internal network. Each of the plurality of proxy servers provide a substantially identical identification for authentication when establishing the first and second secure connections.

21 Claims, 11 Drawing Sheets

(56) References Cited

OTHER PUBLICATIONS

Kwang-Ryoul Kim; Seung-Kuck Kim; Sung-Gi Min, "mSCTP Connection Setup Method to Mobile Node Using Connection Setup Proxy," Computer and Information Technology, 2006. CIT '06. The Sixth IEEE International Conference on , vol., no., pp. 77,77, Sep. 2006.*

Wu, H.; Burt, A.; Thurimella, R., "Making secure TCP connections resistant to server failures," Computer Security Applications Conference, 2003. Proceedings. 19th Annual , vol., no., pp. 197,206, Dec. 8-12, 2003.*

Translation of Decision on Grant mailed Aug. 1, 2013 in Russian Application No. 2011107243/08(010310).

* cited by examiner

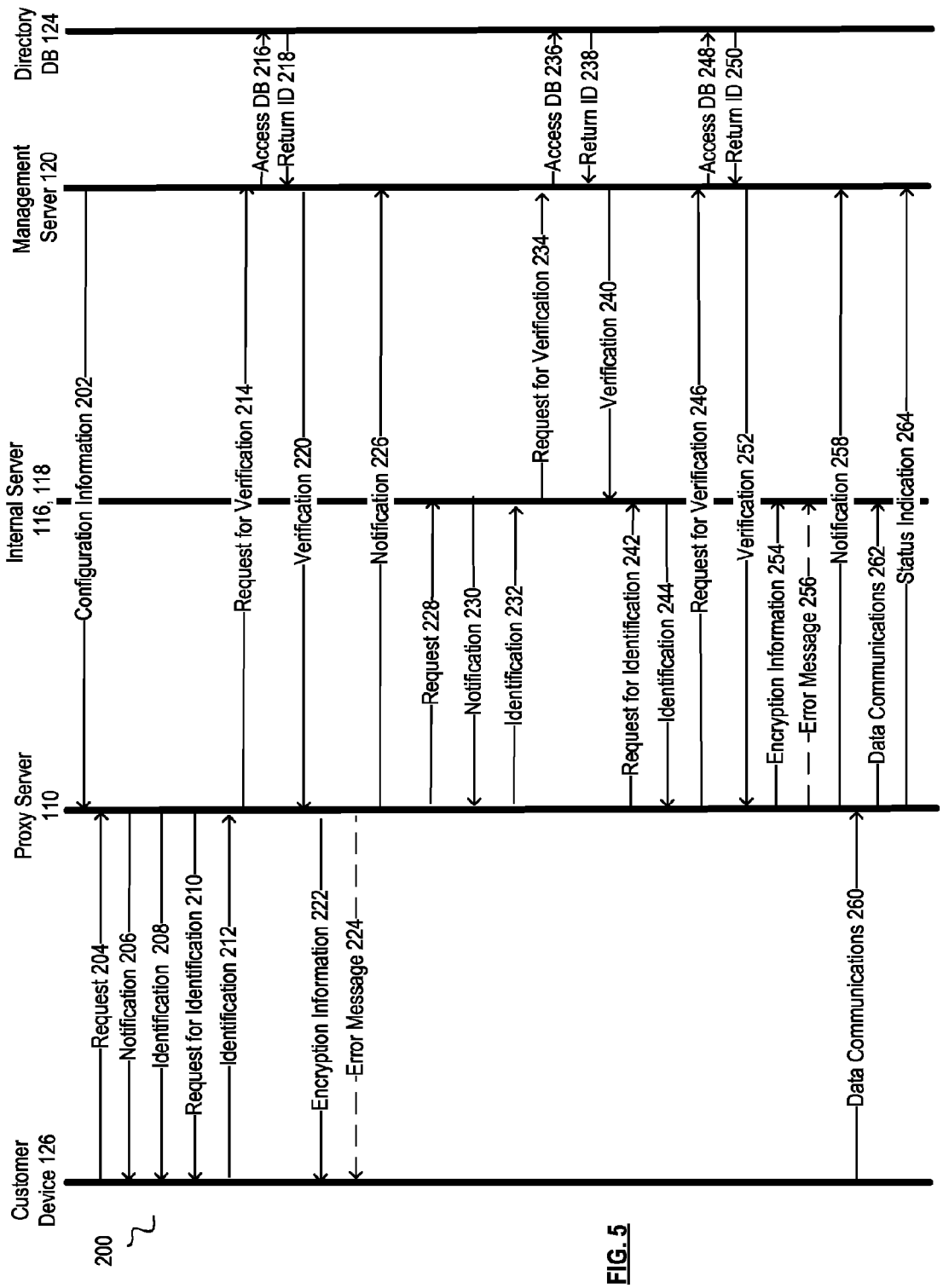

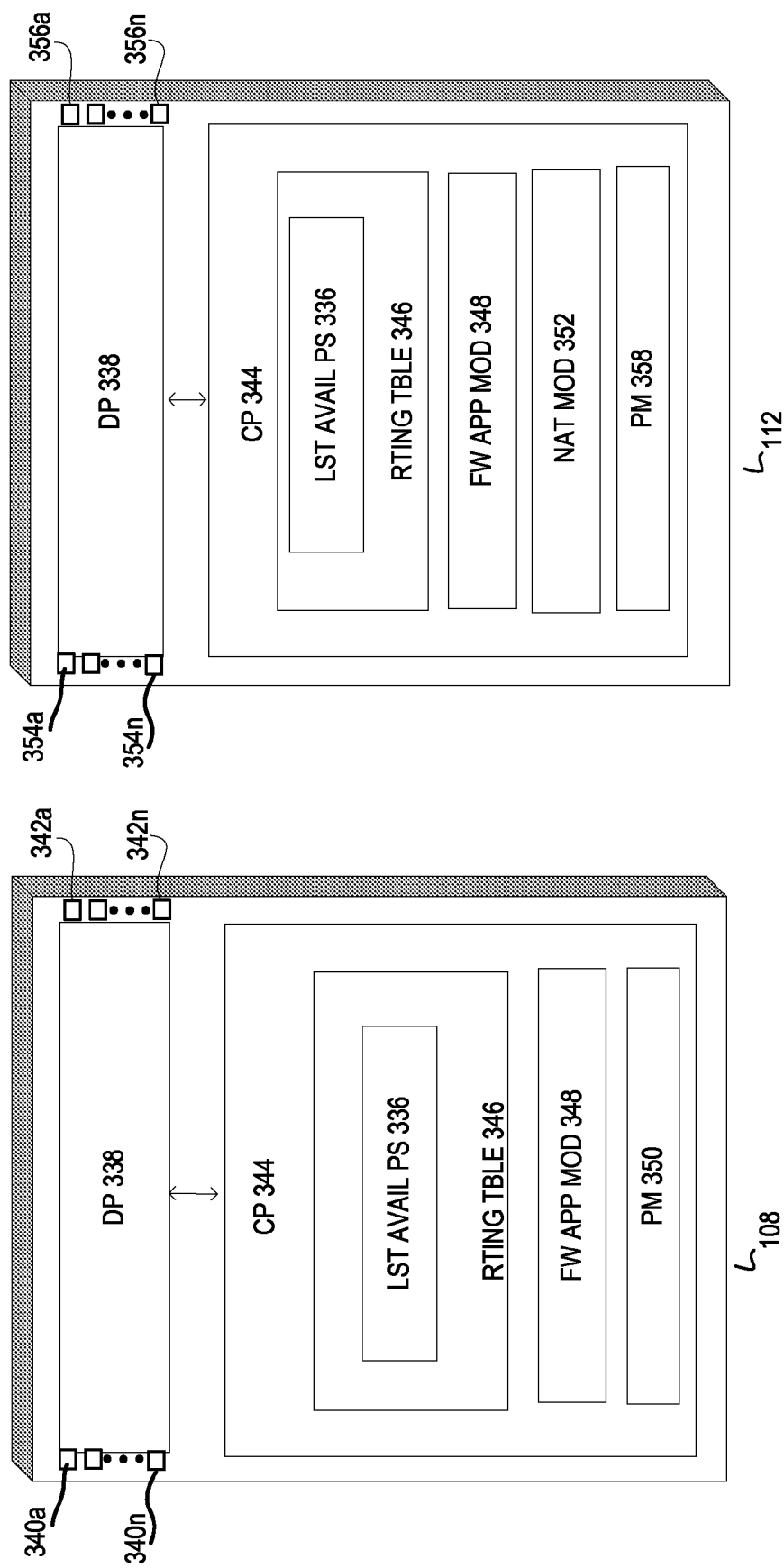

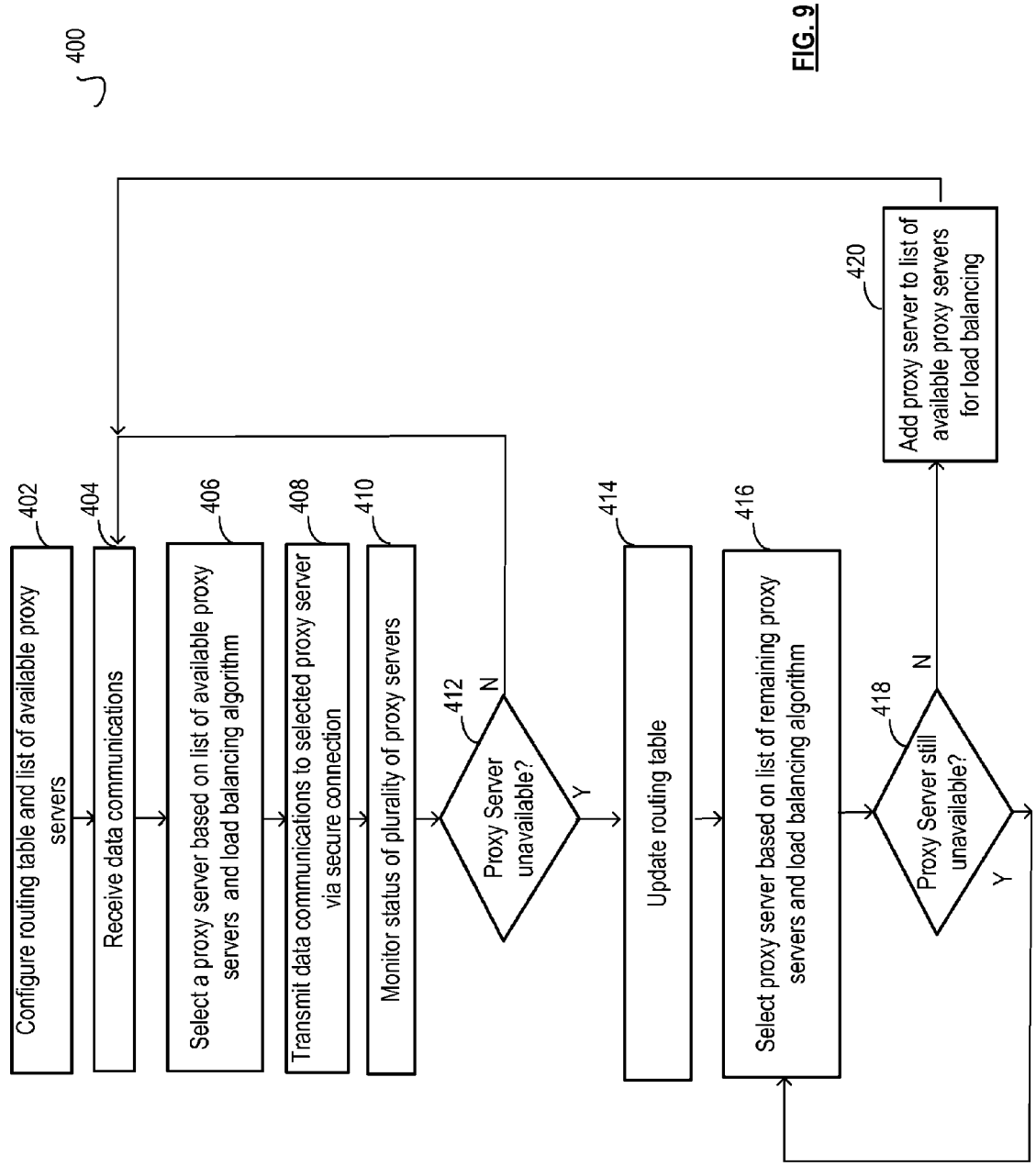

NETWORK ARCHITECTURE FOR SECURE DATA COMMUNICATIONS

CROSS-REFERENCE TO RELATED PATENTS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to a network architecture for secure data communications and more particularly to a network architecture with security and high availability for data communications between a secure internal network and an unsecure external network.

2. Description of Related Art

A network edge is particularly vulnerable to unauthorized data transfers and intrusions, especially between an internal secure network and a public external network, such as the Internet. Unauthorized data transfers, such as viruses, spyware, and other types of malware, may be introduced from an external network to an internal network during data communications. In addition, unauthorized intruders from an external network may attempt to access confidential information of an internal network.

The most recent security threats to internal networks are in data theft, data leakage, and targeted code for the purpose of stealing confidential information that can be used for financial gain. For example, credit card information is often targeted for theft. While virus and phishing may obtain the credit card information of a few thousand cardholders, unauthorized access into a single large database of an internal network provides access to millions of cardholder accounts.

In response to increased threats, the Payment Card Industry Data Security Standards (PCI DSS) was developed by American Express, Discover Financial Services, JCB International, MasterCard Worldwide and Visa Inc., to help facilitate the broad adoption of consistent data security measures in internal networks storing financial data. PCI DSS is a set of comprehensive principles and requirements for enhancing payment account data security with the use of firewall configuration, antivirus software, data encryption and additional security best practices. The PCI Security Standards Council, an independent organization, is responsible for developing and overseeing the standards. The PCI Security Standards Council is an open global forum for the ongoing development, enhancement, storage, dissemination and implementation of security standards for account data protection. The core of the PCI DSS is a group of principles and accompanying requirements around which the specific elements of the DSS are organized. The first principle of the PCI DSS is to "Build and Maintain a Secure Network" with the requirement to "Install and maintain a firewall configuration to protect cardholder data." Therefore, a need exists for a network architecture with high availability and security for data communications between a secure internal network and an unsecure external network that protects the internal network from unauthorized data transfers and intrusions.

BRIEF DESCRIPTION OF THE SEVERAL VIEWS OF THE DRAWINGS

FIG. 5 is a logic diagram of an embodiment of a method for establishing secure connections between an internal network and an external network in accordance with the present invention;

FIG. 7 is a schematic block diagram of an embodiment of an external edge node operable for load balancing in accordance with the present invention;

FIG. 8 is a schematic block diagram of an embodiment of an internal edge node operable for load balancing in accordance with the present invention;

FIG. 9 is a logic diagram of an embodiment of a method for data communications with high availability and load balancing between an internal network and an external network in accordance with the present invention;

DETAILED DESCRIPTION OF EMBODIMENTS OF THE INVENTION

Figure 1:
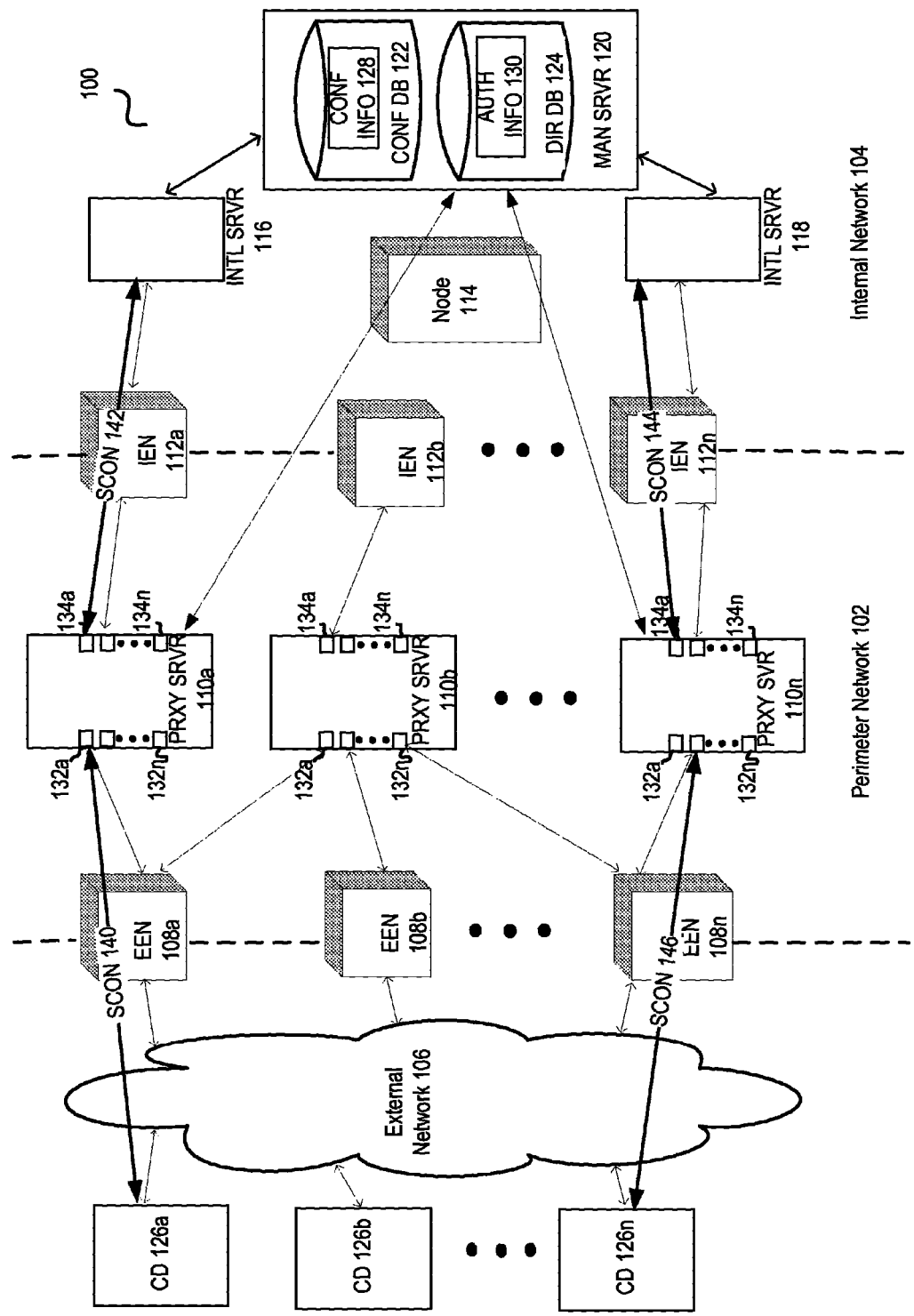
FIG. 1 is a schematic block diagram of an embodiment of a network architecture for data communications between an internal network and an external network in accordance with the present invention.

FIG. 1 is a schematic block diagram of an embodiment of a network architecture for data communications between an internal network and an external network in accordance with the present invention. The network architecture 100 includes a demarcation zone (DMZ) or perimeter network 102 connected between an internal network 104 and an external network 106. The perimeter network 102 may be a separately managed network from the internal network 104 or a sub-network of the internal network 104. The internal network 104 is a secure network, such as a private or corporate local area network (LAN) or wide area network (WAN). The external network 106 is a public network, such as the Internet, or an unknown third party private network.

The perimeter network 102 includes one or more external edge nodes 108a to 108n that are connected to the external network 106. The external edge nodes 108a-n may be gateways, routers, switches, bridges, servers or a combination thereof. The perimeter network 102 also includes a plurality of proxy servers 110a to 110n that are each connected to one or more of the external edge nodes 108a-n. One or more internal edge nodes 112a to 112n are connected between the plurality of proxy servers 110a-n and the internal network 104. The internal edge nodes 112a-n may be gateways, routers, switches, bridges, servers or a combination thereof. The internal edge nodes 110a-n are connected to one or more internal servers 116 and 118. The internal network 104 further includes an internal node 114 that may be a gateway, router, switch, bridge, server or a combination thereof. The internal node 114 connects the plurality of proxy servers 110a-n to a management server 120. The management server 120 includes a configuration database 122 for storing configuration information 128 for the proxy servers 110a-n and a directory database 124 for storing authentication information 130 of authorized users of the internal network 104. The configuration database 122 and directory database 124 may be one or more databases included within the management server 120 or may be separate devices connected to the management server 120.

In operation, the plurality of proxy servers 110a-n handle data communications transmitted between the external network 106 and the internal network 104. The data communications include file or data transfers that are transmitted using the Hyper Text Transfer Protocol (HTTP) protocol, File Transfer Protocol (FTP) or other protocol operable for file or data transfer. The management server 120 configures each of the plurality of proxy servers 110a-n with substantially identical configuration information 128 stored in the configuration database 122. The proxy servers 110a-n are operable to provide the configuration information 128 during authentication to establish the secure connections for data communications between a customer device 126a-n and the internal network 104.

When a customer device 126 requests data communications with the internal network 104, one of the plurality of proxy servers 110a-n is selected based on a list of available proxy servers 110a-n. The selected proxy server 110 establishes a first secure connection 140 over the external network 106 between the proxy server 110 and the customer device 126. A secure connection is a communication path through one or more networks established using a secure connection protocol, such as secure socket layer (SSL) or transport layer security (TLS), that provides authentication of a source or destination. In an embodiment, the first secure connection 140 includes mutual authentication of the source and destination, e.g. the customer device 126 and the proxy server 110 in FIG. 1. Mutual authentication of the source and destination provides increased security regarding the identity of devices requesting the data communication. Mutual authentication is performed by exchanging identifications, such as digital certificates, between the source and destination. The proxy server 110 is operable to provide identification information as part of a digital certificate or other form of identification during the mutual authentication. The identification information or digital certificate provided by the proxy server 110 includes substantially identical configuration information 128 as the other proxy servers 110a-n, as explained in more detail below. In an embodiment, a secure connection also provides encryption of data communications.

Once the first secure connection 140 is established between the customer device 126 and the proxy server 110, the proxy server 110 then establishes a second secure connection 142 between itself and a destination for the data communications in the internal network 104, such as one of the internal servers 116, 118. The second secure connection 142 is also established using a secure connection protocol with mutual authentication and encryption. After the first and second secure connections are established, data communications from the customer device 126 is received over the first secure connection 142 through a first port 132a-n of the proxy server 110. The proxy server 110 then reassigns the address of the data communications to a destination address of the internal network 104. The proxy server 110 then transmits the data communications from a second port 134a-n of the proxy server 110 over the second secure connection 142. By blocking direct access to the internal network 104, the proxy server 110 provides security for data communications from the external network 106 to the internal network 104. In addition, the data communications are not stored in the proxy server 110 which provides an additional level of security.

Similarly, when an internal server 116, 118 requests data communications with a destination over the external network 106, such as one of the customer devices 126a-n, one of the plurality of proxy servers 110a-n establishes a first secure connection 144 to the internal server 116, 118 using secure socket layer (SSL), transport layer security (TLS) or other secure connection protocol. The proxy server 110 then establishes a second secure connection 146 between the proxy server 110 and the customer device 126a-n. Once the first and second secure connections are established, data communications from the internal server 116, 118 are received over the first secure connection 144 by one port 136 of the proxy server 110 and are then forwarded from another port 138 of the proxy server 110 over the second secure connection 146 over the external network 106 to the customer device 126a-n.

Because the configuration information 128, in the form of a digital certificate or other identification, provided by the proxy servers 110a-n is substantially identical when establishing secure connections, a customer device 126a-n is not able to discern between proxy servers 110a-n, and secure connections may be established by any of the plurality of proxy servers 110a-n for data communications. In addition, data communications may be switched between the proxy servers 110a-n in the event that one of the proxy servers becomes unavailable. Thus, the perimeter network 102 provides high availability and security for data communications between the external network 106 and the internal network 104.

The management server 120 is operable to monitor the plurality of proxy servers 110a-n and the status of secure connections with the plurality of proxy servers 110a-n. The management server 120 continuously monitors the status of the secure connections for file transfer errors, exceptions and successes. When a secure connection is not successfully established or is interrupted, the management server 120 provides notifications or alerts to re-initiate establishment of the secure connection. The management server 120 also provides audit trails and reports on the secure connections with the plurality of proxy servers 110a-n.

Figure 2:
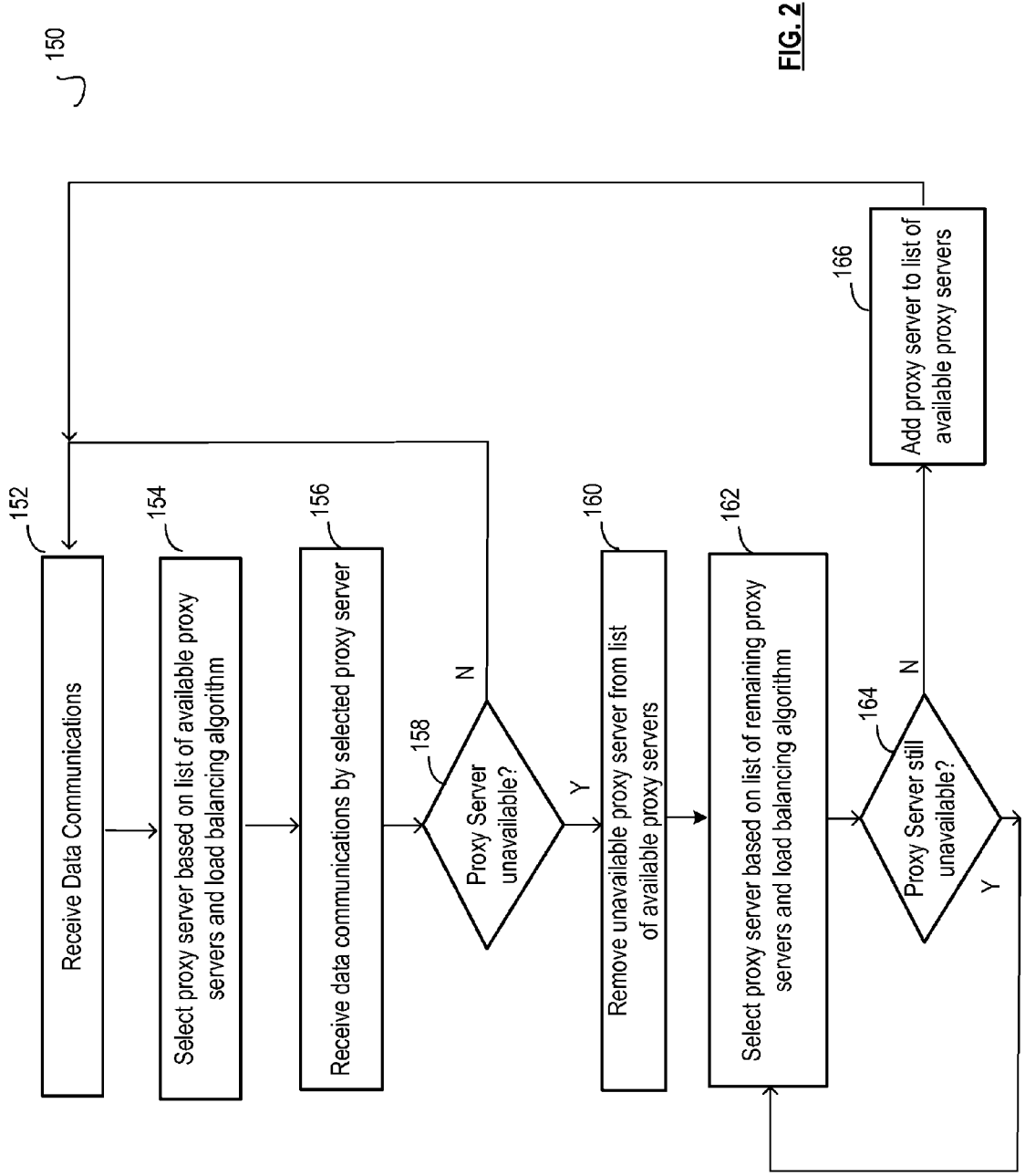
FIG. 2 is a logic diagram of an embodiment of a method for data communications between an internal network and an external network in accordance with the present invention.

FIG. 2 is a logic diagram of an embodiment of a method 150 for secure data communications with high availability between the internal network 104 and the external network 106 in accordance with the present invention. Data communications are received by the perimeter network 102 as shown in step 152. In step 154, one of a plurality of proxy servers is selected to receive the data communications based on a list of available proxy servers. In an embodiment, the list of available proxy servers may be maintained by one or more of the external edge nodes 108a-n, by one or more of the plurality of proxy servers 110a-n or by one or more load balancing nodes, as discussed in more detail below. In other embodiments, the list of available proxy servers may be maintained by another node or network management system. In step 156, the data communications are transmitted to the selected one of the plurality of proxy servers 110a-n in the perimeter network 102. Since each of the plurality of proxy servers 110a-n has been configured with substantially identical configuration information 128, a customer device 126a-n is not able to discern between proxy servers 110a-n, and data communications may be received by any of the plurality of proxy servers 110a-n.

In step 158, it is determined whether one of the proxy servers 110-n becomes unavailable. The determination may be made by the external edge nodes or one of the available proxy servers or by other devices as described below. When the proxy servers 110a-n are available, the process returns to step 152 to continue receiving data communications. When one of the proxy servers 110a-n becomes unavailable, the unavailable proxy server 110 is removed from the list of available proxy servers, as shown in step 160. The data communication then continues as shown in step 162. A proxy server 110 is selected to receive data communications based on a list of remaining one or more available proxy servers. In step 164, the unavailable proxy server is monitored to determine its status. When it becomes available again, the proxy server is added back to the list of available proxy servers, as shown in step 166. Data communications may then be received by the proxy server again based on the list of available proxy servers, as shown in step 152.

Thus, the perimeter network 102 provides secure connections and high availability for data communications between the external network 106 and the internal network 104. High availability may be performed because each of the plurality of proxy servers 110a-n have substantially similar configuration information 128. This similarity among the proxy servers 110a-n allows for transmitting data communications to other available proxy servers 110a-n in the event of a failure of one of the proxy servers 110a-n.

Figure 3:
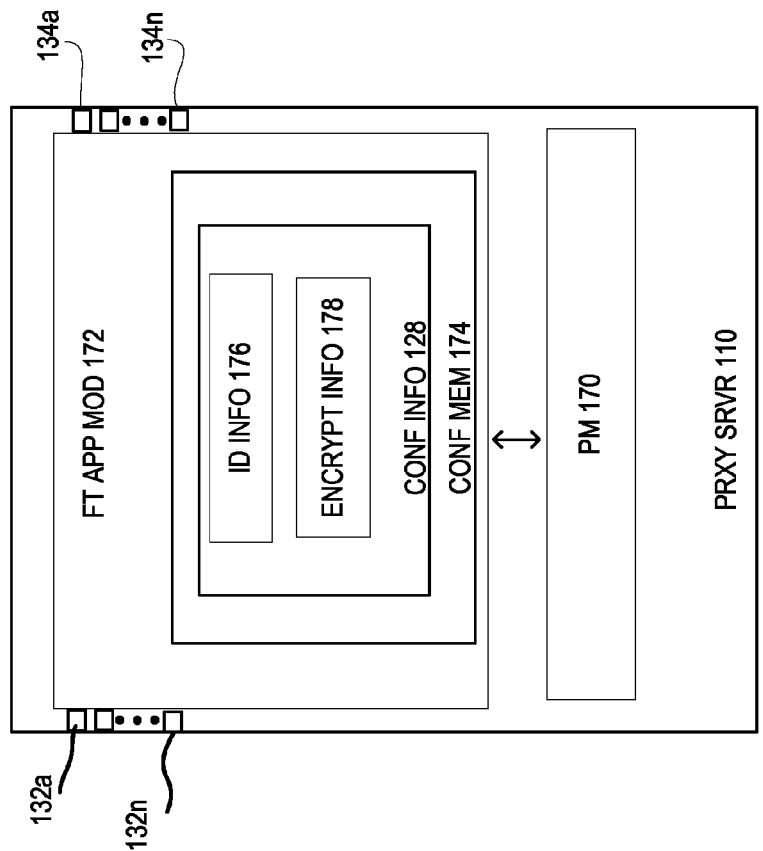
FIG. 3 is a schematic block diagram of an embodiment of a proxy server in accordance with the present invention.

FIG. 3 is a schematic block diagram of an embodiment of a proxy server 110 in accordance with the present invention. The proxy server includes a processing module 170 and a file transfer application module 172. The file transfer application module 172 includes a configurable memory 174 that stores configuration information 128 for the proxy server 110 from the management server 120. The configuration information 128 includes identification information 176 and encryption information 178. The identification information 176 includes a server identification, a certificate authority for verifying server identification, version number of certificate format, valid to or valid from dates for the identification information, or other necessary information for the digital certificate or other form of identification used in establishing the secure connection. The encryption information 178 includes a public encryption key and a private encryption key for a public encryption system, supported key exchange algorithms, ciphers and hash functions. Other encryption information 178 may be configured as needed or alternative encryption information 178 may be configured for other encryption methods used for encrypting data communications in a secure connection. The file transfer application module 172 and processing module 170 are operable to perform the data communications functions and operation described herein.

Figure 4:
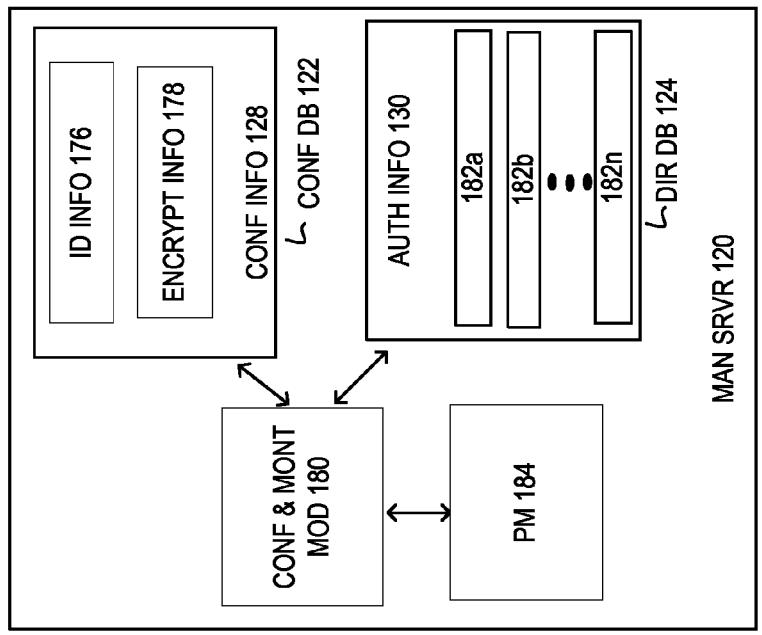
FIG. 4 is a schematic block diagram of an embodiment of a management server in accordance with the present invention.

FIG. 4 is a schematic block diagram of the management server 120. The management server 120 includes a configuration and monitoring module 180 and a processing module 184. The management server 120 also includes a configuration database 122 with the configuration information 128 for each of the plurality of proxy servers 110a-n. The configuration information 128 includes the identification information 146 and the encryption information 148 for each of the proxy servers 110a-n. The management server 120 also includes the directory database 124 that includes authentication information 130 for authorized users of the internal network 104. The authentication information 130 includes an entry 182a-n for each authorized user with authentication information. Each entry 182a-n may include identification information, encryption information or other information for the authorized user. The configuration and monitoring application module 180 and processing module 184 are operable to perform the functions and operation of the management server 120 described herein.

FIG. 5 is a logic diagram of an example of a method 200 for establishing secure connections between the internal network 104 and the external network 106. In step 202, the configuration information 128 for each proxy server 110 is transmitted by the management 120 to each of the proxy servers 110. Each of the proxy servers 110a-n are configured with substantially identical configuration information 128 by the management server 120.

Next, a first secure connection is established using a secure connection protocol between one of the customer devices 126a-n and one of the plurality of proxy servers 110. The method begins when one of the plurality of proxy servers 110 receives a request for data communications from one of the customer devices 126a-n, as shown in step 204. When the secure protocol includes encryption, the request for data communications includes a list of supported encryption parameters, such as key exchange algorithms, ciphers, hash functions, etc. For example, the key exchange algorithms may include RSA, Diffie-Hellman, DSA, SRP, PSK or other such algorithms. Ciphers may include RC4, Triple DES, AES, Camellia, RC2, IDEA and DES or other ciphers. Hash functions may include HMAC-MD5 or HMAC-SHA or other functions. Other parameters may also be specified in the request for data communications.

When the proxy server 110 receives the request for data communications, it selects among the listed secure connection protocol parameters and transmits a notification of selected parameters to the customer device 126, as shown in step 206. The proxy server 110 also transmits an identification with configuration information 128, as shown in step 208. The identification may be in the form of a digital certificate, such as an ITU-T standard X.509 digital certificate or other form of identification. The configuration information 128 in the identification transmitted by the proxy server 110 includes at least identification information 176, such as an identification of the proxy server 110. In addition, the identification may also include encryption information 178 such as the proxy server's public encryption key.

The proxy server 110 then requests an identification, such as a digital certificate, from the customer device 126a-n in step 210 in order that the secure connection for data communications may be mutually authenticated. The customer device 126a-n transmits an identification to the proxy server 110, as shown in step 212. In an embodiment, the proxy server 110 verifies the identity of the customer device 126a-n with a third party certificate authority. In another embodiment, the proxy server 110*a-n* transmits the identification to the management server 120 for verification, as shown in step 214. The management server 120 verifies the identity by accessing the directory database 132 of authorized users as shown in step 216. In step 218, the directory database 132 provides requested authentication information 130 for the management server 120 to determine whether the identification matches an entry 182*a-n* of an authorized user in the directory database 124. When the identification is verified, the management server 120 transmits a verification message to the proxy server 110, as shown in step 220.

In order to generate the session keys used for the first secure connection, the customer device 126*a-n* encrypts a random number with the proxy server's public encryption key, and sends the result to the proxy server 110, as shown in step 222. Since each of the proxy servers 110*a-n* have been configured with substantially identical configuration information 128, including public and private encryption keys, any of the proxy servers 110*a-n* may decrypt the random number with its respective private key. From the random number, the customer device 126*a-n* and the proxy server 110 may generate key material for encryption and decryption. This concludes the establishment of the first secure connection between the customer device 126*a-n* and the proxy server 110. When any one of the above steps fails, the first secure connection between the proxy server 110 and the customer device 126 is not established, and an error message is transmitted by the proxy server 110 to the customer device 126, as shown in step 224. The proxy server 110 transmits a notification of the first secure connection to the management server 120 in step 226. The notification includes whether the connection was successfully established or whether an error occurred and was not established. In addition, the notification may include information about the first secure connection, such as key material for encryption, necessary for each of the plurality of proxy servers 110*a-n* to communicate over the first secure connection. The management server 120 stores the information about the first secure connection in the directory database 124.

When the first secure connection is established, the proxy server 110 establishes the second secure connection with one of the internal servers 116,118 using a secure connection protocol. The proxy server 110 transmits a request for data communications to one of the internal servers 116,118, as shown in step 228. In an embodiment, the request for data communications includes a list of supported secure connection protocol parameters, such as key exchange algorithms, ciphers, hash functions, etc. When the internal server 116,118 receives the request for data communications, it selects among the listed secure connection protocol parameters and transmits a notification with selected parameters to the proxy server 110*a-n*, as shown in step 230. In another embodiment, the proxy server 110 and the internal server 116,118 have been configured with the secure connection protocol parameters to utilize when establishing a secure connection. In this embodiment, the request only needs to include the configured supported secure connection protocol parameters and the notification from the internal server 116, 118 includes an acknowledgement of the pre-configured secure connection protocol parameters.

Next, the proxy server 110*a-n* transmits an identification, such as a digital certificate, to the internal server 116,118, as shown in step 232. As described above, each of the proxy servers 110*a-n* are configured with substantially identical configuration information 128 for digital certificates. The internal servers 116,118 may request verification of the identity of the proxy server 110 from the management server 120, as shown in step 234. The management server 120 accesses the directory database 124 to verify the identity of the proxy server 110*a-n* in step 236. In step 238, the management server 120 compares the requested identification to determine whether the identification matches an authorized user in the directory database 124. When verified, the management server 120 transmits a verification to the internal server 116, 118 as shown in step 240. The proxy server 110 may request an identification, such as a digital certificate, from the internal server 116,118, so that the secure connection for data communications may be mutually authenticated, as shown in step 242. The internal server 116,118 transmits an identification, such as a digital certificate to the proxy server 110, as shown in step 244. The proxy server 110 requests verification of the identification to the management server 120, as shown in step 246. The management server 120 verifies the identity by accessing the directory database 132 in step 248 and determining whether the identification matches an entry 150*a-n* for an authorized user in the directory database 132, as shown in step 250. The management server 120 transmits a verification message to the proxy server 110*a-n*, as shown in step 252.

When verified, in order to generate the session keys used for the secure connection, the internal server 116, 118 encrypts a random number with the proxy server's public key, and sends the result to the proxy server 110, as shown in step 254. Since each of the proxy servers 110*a-n* have been configured with substantially identical identification information including public and private keys, any of the proxy servers 110*a-n* may decrypt the random number with its respective private key. From the random number, the internal server 116, 118 and the proxy server 110 may generate key material for encryption and decryption. This concludes the establishment of the second secure connection between one of the proxy servers 110*a-n* and one of the internal servers 116, 118. When any one of the above steps fails, the second secure connection is not established, and an error message is transmitted by the proxy server 110*a-n* to internal server 116, 118, as shown in step 256. The proxy server 110 transmits a notification of the second secure connection to the management server 120 in step 258. The notification includes whether the connection was successfully established or an error occurred and was not established. In addition, the notification may include information about the second secure connection, such as key material for encryption, necessary for each of the plurality of proxy servers 110*a-n* to communicate over the second secure connection.

Once the first and second secure connections are established, data communications are encrypted and decrypted with the key material until the secure connections are closed. Data communications are received by one of the proxy servers 110*a-n* as shown in step 260 from one of the customer devices 126*a-n* over the first secure connection. The data communications are received over a first port of the proxy server 110. The proxy server 110 revises the destination address of the data communications and transmits the data communications to the internal network 104 over the second secure connection using a second port as shown in step 262. In an embodiment, the destination address may be a single network IP address for the internal network 104 that is translated by one of the internal edge routers 118*a-n*. In another embodiment, the destination address may be an internal network address for one of the internal servers 116, 118. During the above process, the proxy server 110 transmits status indications to the management server 120 notifying the management server 120 of the status of the first and second secure connections and data communications, as shown in step 264. The proxy server 110*a-n* provides status indications relating to the first and second secure connections, such as when the secure connections are established, completed or an error occurs during establishment. The proxy server 110 also provides status indications to the management server 120 when data communications are started, completed or interrupted.

Figure 6:
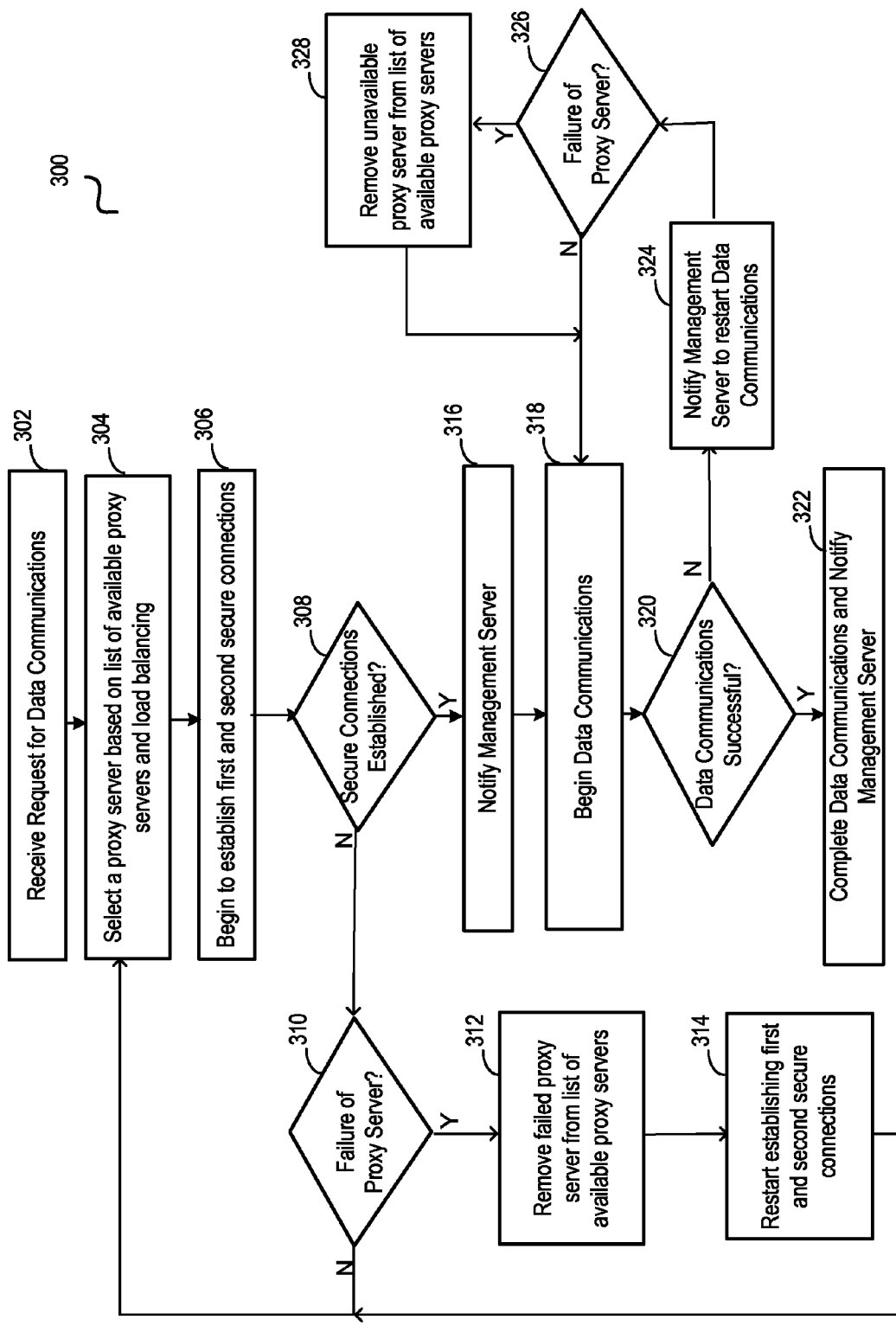
FIG. 6 is a logic diagram of an embodiment of a method for data communications with high availability and load balancing between an internal network and an external network in accordance with the present invention.

In an embodiment of the present invention, high availability of the data communications is implemented in the perimeter network 102 using a load balancing method between the plurality of proxy servers 110. FIG. 6 is a logic diagram of an embodiment of a method 300 for high availability with load balancing between a secure internal network and an unsecure external network in accordance with the present invention. In step 302, a request for data communications is received from one of the customer devices 126 over the external network 106. In step 304, one of a plurality of proxy servers is selected to receive the request for data communications based on a list of available proxy servers and load balancing between the plurality of proxy servers 110a-n. Load balancing may be implemented using various methods, including load balancing by the external edge nodes 108 and load balancing using a clustering server method, as described in more detail below. In each method, a list of available proxy servers 110a-n for load balancing is maintained. In step 306, the request for data communications is transmitted to the selected one of the plurality of available proxy servers 110a-n in the perimeter network 102. In step 306, the proxy server 110 begins to establish a first secure connection with the customer device 126 and then a second secure connection with one of the internal servers 116, 118. The secure connections may be established as described above with respect to FIG. 5.

In step 308, it is determined whether the first and second secure connections are established. In one embodiment, the management server 120 performs the determination in response to the notification of establishment of the secure connections from the proxy server 110 or in response to an error message in establishment of the secure connections from an internal server 116, 118. In other embodiments, the determination may be performed by an external edge node 108 or internal edge node 112 or internal servers 116, 118. In the event that a first or second secure connection has failed to be established, it is determined whether the failure is due to the proxy server 110, as shown in step 310. In one embodiment, the external edge nodes 108 monitor the proxy servers 110 to determine a failure in one of the proxy servers. In other embodiments, a load balancing node or the proxy servers 110a-n monitors the availability to determine a failure of a proxy server as explained in more detail below. A proxy server may be unavailable due to a failure in the proxy server or in a link to the proxy server or a scheduled maintenance to the proxy server or other reasons that cause the proxy server unable to respond or operate effectively. When one of the plurality of proxy servers 110 has become unavailable, the proxy server is removed from the list of available proxy servers for load balancing, as shown in step 312. The method then continues to step 314 with re-attempting to establish the first and second secure connections for data communications.

When the first and second secure connections for data communications have been established, the proxy server 110 notifies the management server 120 as shown in step 316. Data communications begin as shown in step 316. During data communications, the management server 120 receives notifications from the proxy server 110 and determines any errors or interruptions in the data communications as shown in step 318. When no failures or errors occur, the data communications are completed as shown in step 320. When a failure is detected in the data communications, an alert or notification is provided to the management server 120 to restart or retry the data communications as shown in step 322. In step 324, a determination is made whether one of the proxy servers 110 has become unavailable. When one of the proxy servers 110a-n is detected as being unavailable, then the proxy server is removed from the list of available proxy servers for load balancing, as shown in step 326. The data communications are then transmitted again to one or more available proxy servers 110a-n, as shown in step 316.

In an embodiment, load balancing for high availability is implemented by the external edge nodes 108a-n and the internal edge nodes 112a-n. A routing table with a list of available proxy servers 110a-n for load balancing is maintained by each of the external edge nodes 108a-n and the internal edge nodes 112a-n. Data communications are load balanced between each of the available plurality of proxy servers 110a-n by the external edge nodes 108a-n and the internal edge nodes 112a-n.

FIG. 7 is a schematic block diagram of an embodiment of an external edge node 108 operable for load balancing in accordance with the present invention. The external edge node 108 includes a data plane 338 that is operable to switch data communications from input ports 340a-n to output ports 342a-n. The external edge node 108 also includes a control plane 344 that is operable to control the switching of the data communications in the data plane 338. The control plane includes a processing module 350, a firewall application module 348 and a routing table 346.

The control plane 344 is operable to update the routing table 346 using such standard protocols as routing information protocol (RIP), interior gateway routing protocol (IGRP) and open shortest path first (OSPF) or other protocols that provide routing or topology update messages. When an external edge node 108 receives a routing update message that includes changes to an entry, it updates its routing table 346 to reflect the new route. The routing table 346 is also updated with multiple entries for a destination when more than one path to the destination is determined. For example, the routing table 346 includes a destination list with an entry of an address for internal network 104. The routing table 346 then includes a list of available proxy servers 336 in the path to the destination of the internal network 104.

TABLE 1

| Destination | List of Available Proxy Servers 336 |
|---|---|
| Address for Internal Network 104 | via Address for Proxy Server 110a |
| | via Address for Proxy Server 110b |
| | ... |
| | Via Address for Proxy Server 110n |

Embodiment of Entries in Routing Table 346

Additional addresses may be added to the list for additional available proxy servers 110. The list of available proxy servers 336 may be updated through standard routing protocols or through configuration by a system administrator. The routing table 346 may include one or more tables or databases that are in different formats from the illustrated table described herein.

In operation, the external edge node 108 maintains the list of available proxy servers 336 for the destination of the internal network 104. The external edge node 108 uses a load balancing algorithm to distribute the data communications among the list of available proxy servers 336. The load balancing algorithm may be a round robin algorithm or other algorithm depending on the desired implementation. Another common algorithm is to load balance based on the content of the request for data communications such as the IP address of the requestor or some other information in the request.

The load balancing algorithm may operate on a per packet or per destination basis. In per-packet load balancing, the edge node transmits successive data packets in a data communication over different paths based on a load balancing algorithm. The edge node may select to transmit one packet with a destination in the internal network 104 to a first proxy server 110a-n, the second packet for the same destination to a second proxy server 110a-n, and so on. Per-packet load balancing ensures load balancing over multiple proxy servers 110a-n to the internal network 104. In per-destination load balancing, the edge node distributes packets based on the destination of the packets in the data communications and a load balancing algorithm. Packets in data communications to a destination from the same source are transmitted to the same proxy server 110a-n. For example, the edge node transmits packets for a first destination in the internal network to a first proxy server 110a-n, packets for a second destination in the internal to a second proxy server 110a-n, and so on.

When a request for data communications with the internal network 104 arrives at a first port 340 of the external edge node 108, the external edge node 108 forwards the request for data communications over another port 342 to one of the plurality of proxy servers 110 based on the list of available proxy servers 336 and the load balancing algorithm.

The load balancing by the external edge node 108 also provides high availability. When routing or topology changes occur in the network, the routing table 346 is updated by the standard routing protocols or by a system administrator. In addition, the external edge node 108 periodically pings the plurality of proxy servers 110a-n to determine their availability. In the event that one of the plurality of proxy servers 110a-n becomes unavailable, then the external edge node 108 removes the address of the unavailable proxy server from the list of available proxy servers 336 for load balancing in the routing table 346. Data communications are then only transmitted to the remaining available one or more proxy servers 110. No data communications are transmitted to the unavailable proxy server until the proxy server again becomes available and is again added to the list of available proxy servers 336 for load balancing.

To provide additional security, the external edge node 108 includes a firewall application module 348. The firewall application module 348 may be a separate device or may be incorporated with the external edge node 108. The firewall application module 348 is operable to prevent TCP/IP packets of a data communication from being forwarded to a destination unless the TCP/IP packets match an established rule set for the respective destination. In an embodiment, the firewall application module 348 is a stateful application and disallows a TCP/IP packet unless authorized by the rule set. If a TCP/IP packet in a data communication does not match an existing secure connection with the destination of the packet, it will be evaluated according to a rule set for new connections. If a TCP/IP packet matches an existing secure connection based on comparison with a state table in the firewall application module 348, then the TCP/IP packet of the data communication will be allowed to pass.

FIG. 8 is a schematic block diagram of an embodiment of an internal edge node 112 operable for load balancing in accordance with the present invention. The internal edge node 108 also includes a data plane 338 that is operable to switch data communications from input ports 354a-n to output ports 356a-n. The internal edge node 108 also includes a control plane 344 that is operable to control the switching of the data communications in the data plane 338. The control plane 344 includes a processing module 358, a firewall application module 348 and a routing table 346 with a list of available proxy servers 336.

In operation, the internal edge node 112 uses the list of available proxy servers 336 for load balancing between the proxy servers 110 for destinations connected to the external network 106, such as customer devices 126. When a request for data communications with a customer device 126 arrives at a first port 354 of the internal edge node 112, the internal edge node 112 forwards the request for data communications over another port 356 to one of the plurality of proxy servers 110 based on the list of available proxy servers 336 and a load balancing algorithm.

In an embodiment, the internal edge node 112 also includes a network address translation (NAT) application module 352. The NAT application module 352 may be a separate device or may be incorporated with the internal edge node 112. The NAT application module 352 helps to prevent exposure of internal network addresses of the internal network 104 to the perimeter network 102 or external network 106. The NAT application module 352 is operable to provide a single network IP address for the internal network 104. As such, the proxy servers 110 reassign incoming data communications over the first secure connection to the single network IP address of the internal network 104 and transmit the data communications over the second secure connection. When the data communications with the network IP address are received by an internal edge node 112, the NAT application module 352 is operable to translate the network IP address to one of the multiple internal IP addresses corresponding to a desired destination within the internal network 104. Thus, not even the proxy servers 110a-n have access to internal IP addresses of the internal network 104, such as the IP addresses of the internal server 116 and internal server 118.

FIG. 9 illustrates a logic diagram of an embodiment of a method 400 for high availability with load balancing by the external edge nodes 108 and the internal edge nodes 112 in the perimeter network 102 in accordance with the present invention. The method 400 begins with step 402 when the routing table 346 in an edge node, either an external edge node 108 or internal edge node 112, is configured with a list of available proxy servers for load balancing 336. The list of available proxy servers 336 may be configured by the edge node through standard routing protocols or through configuration by a system administrator. In step 402, the edge node receives data communications and selects one of the plurality of proxy servers 110a-n based on the list of available proxy servers 336 and a load balancing algorithm. Because each of the plurality of proxy servers 110a-n have substantially similar identification information, load balancing of the data communications may be performed between the proxy servers over established secure connections. The edge node transmits the data communications to the selected proxy server over a secure connection as shown in step 406. In step 408, the edge node monitors the status of the plurality of proxy servers 110a-n. To monitor the proxy servers 110a-n, the edge node periodically transmits a status message or ping to each of the proxy servers. When a return status message is not received after a pre-determined time period or number of status messages, then the edge node determines that the proxy server is unavailable in step 410. The proxy server may be unavailable, for example, due to a failure in the proxy server, a failure in a link to the proxy server, maintenance of the proxy server, etc. In addition to monitoring the proxy servers, an edge node may determine that a proxy server is unavailable in response to a routing message according to standard routing protocols or configuration by a system administrator.

When one of the proxy servers 110a-n becomes unavailable, then the edge node updates the routing table 346 and removes the unavailable proxy server from the list of available proxy servers 336, as shown in step 412. The edge node then only selects a proxy server 110a-n to receive data communications that remains on the list of available proxy servers 336, as shown in step 414. In step 416, the unavailable proxy server is monitored to determine whether it is still unavailable. When it becomes available again, the proxy server is added to the list of available proxy servers 336, as shown in step 418. Data communications may then be received again by the proxy server based on the list of available proxy servers 336 and load balancing algorithm, as shown in step 404.

Figure 10:
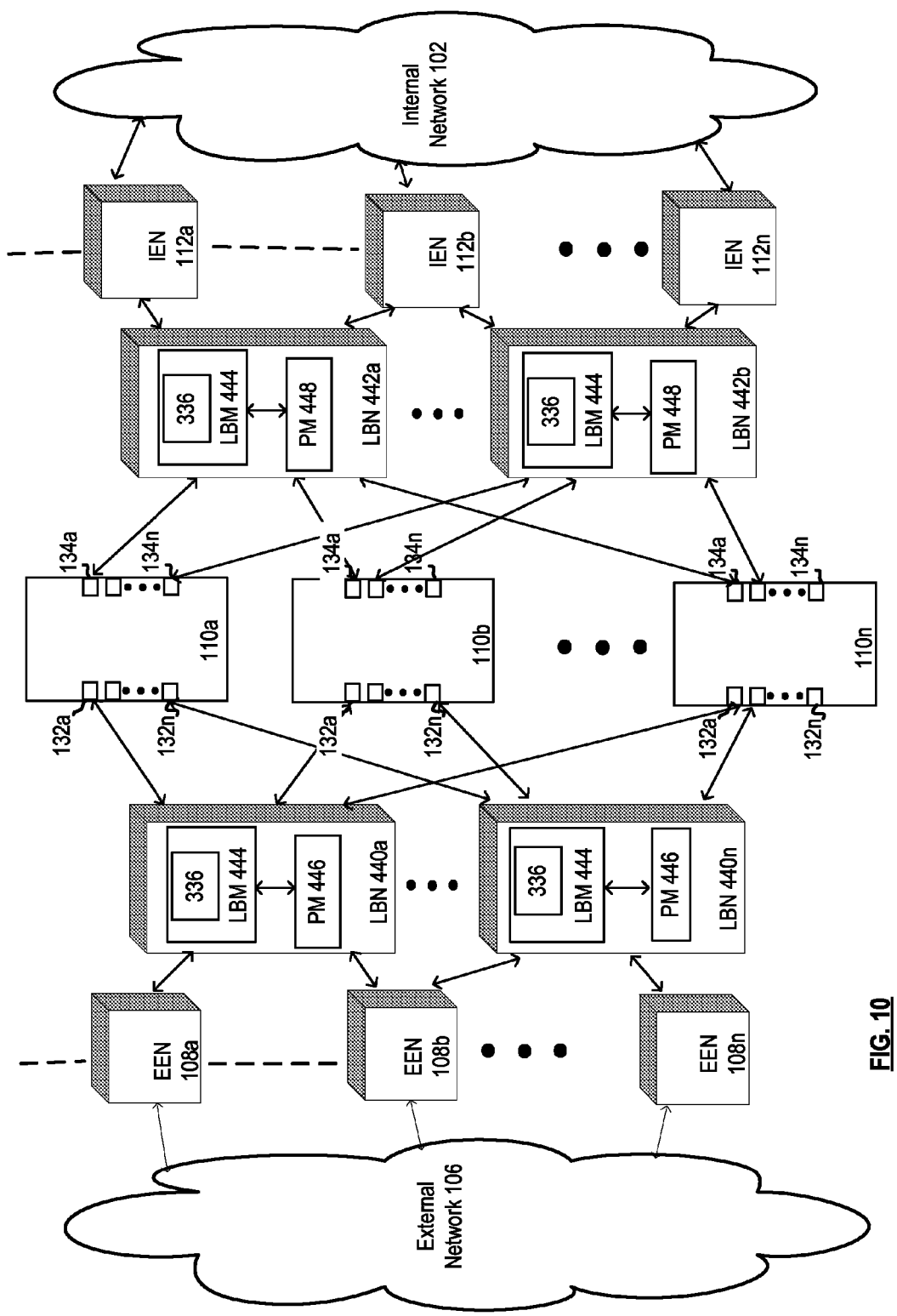
FIG. 10 is a schematic diagram of another embodiment of a network architecture for data communications with high availability and load balancing between an internal network and an external network in accordance with the present invention.

Other methods for providing load balancing and high availability for the plurality of proxy servers may also be implemented in accordance with the present invention. FIG. 10 is a schematic diagram of another embodiment of a network architecture for data communications with high availability and load balancing with a plurality of proxy servers between a secure internal network and an unsecure external network in accordance with the present invention. In an embodiment in FIG. 10, one or more load balancing nodes 440a-n are connected between the external edge nodes 108a-n and the plurality of proxy servers 110a-n. One or more load balancing nodes 442a-n may also be placed between the internal edge nodes 112a-n and the plurality of proxy servers 110a-n. The load balancing nodes 440, 442 include a processing module and a load balancing module that are operable to implement load balancing algorithms. The load balancing module also includes a list of available proxy servers 336.

Figure 11:
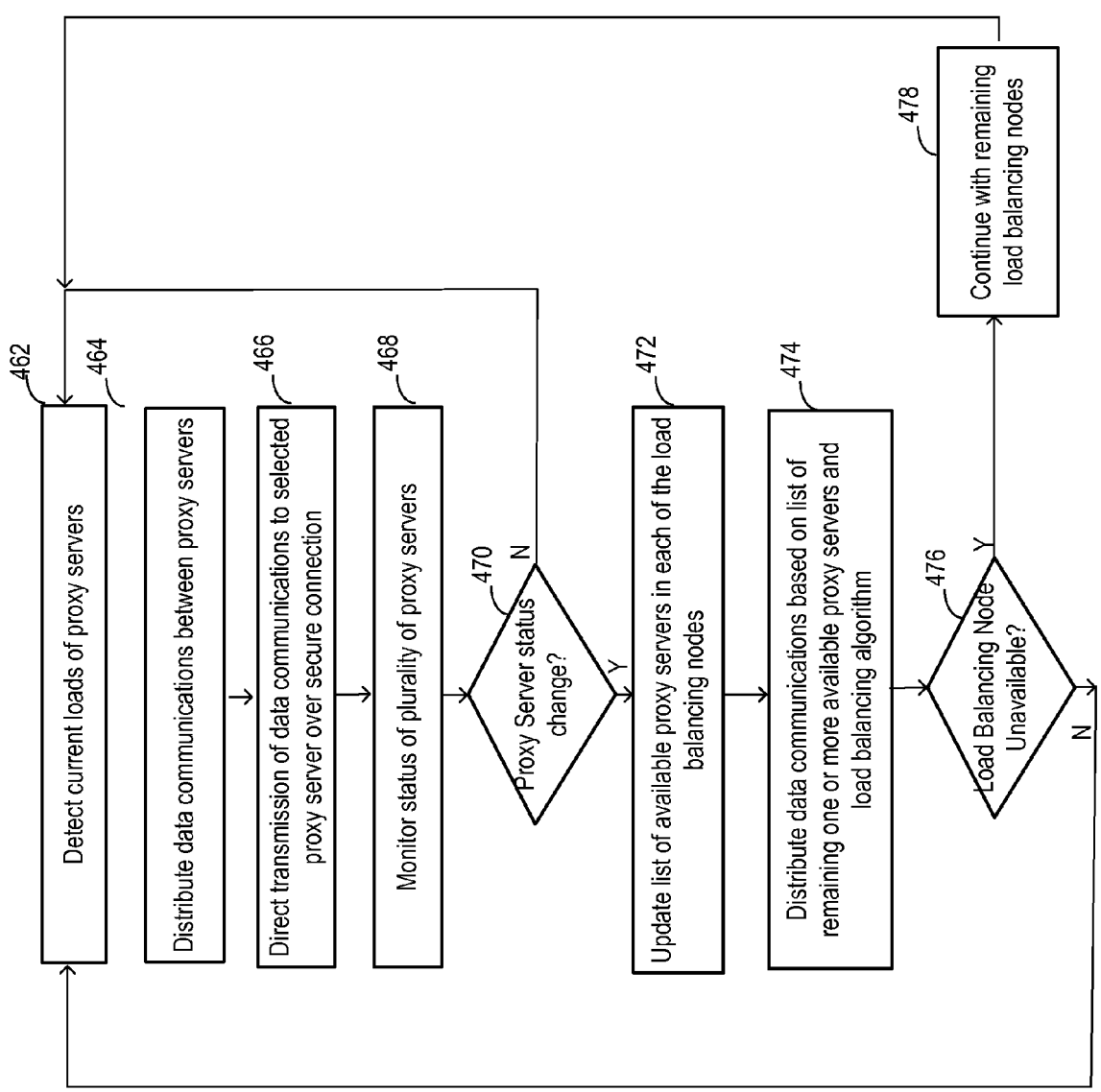
FIG. 11 is a logic diagram of another embodiment of a method for data communications with high availability and load balancing between an internal network and an external network in accordance with the present invention.

FIG. 11 is a logic diagram of an embodiment of a method 460 for load balancing and high availability data communications with the load balancing nodes 440, 442. In operation, the plurality of proxy servers 110a-n are operable as clustering servers for providing capacity for load balancing of the data communications by the load balancing nodes 440,442. In step 462, the load balancing nodes 440,442 are operable to detect current loads of the proxy servers 110a-n. In step 464, the load balancing nodes 440, 442 distribute data communications between the plurality of proxy servers 110a-n in accordance with a load balancing algorithm and list of available proxy servers 336. In step 466, the load balancing nodes 440, 442 direct transmission of data communications to the selected proxy server. In step 468, the load balancing nodes 440,442 also monitor the availability of the plurality of proxy servers 110a-n. In step 470, the load balancing nodes 440, 442 determine whether one of the plurality of proxy servers has become unavailable. When the availability of a proxy server changes, the load balancing nodes update the list of available proxy servers 336, as shown in step 472. For example, the load balancing nodes 440, 442 may remove or add a proxy server 110a-n from the list of available proxy servers 336 when a proxy server 110a-n changes availability status. The load balancing nodes 440, 442 then distribute data communications to the available nodes as per a load balancing algorithm and list of available proxy servers, as shown in step 474. In addition, it may also be determined whether one of the load balancing nodes 440a-n, 442a-n becomes unavailable. The determination may be made by other load balancing nodes that monitor each other or by a system administrator that receives alerts or alarms from the load balancing nodes 440, 442. When a load balancing node becomes unavailable, the remaining load balancing nodes 440, 442 may continue operation to ensure high availability of the data communications, as shown in step 478. The load balancing nodes 440, 442 thus ensure high availability of the data communications in the perimeter network 102.

Figure 12:
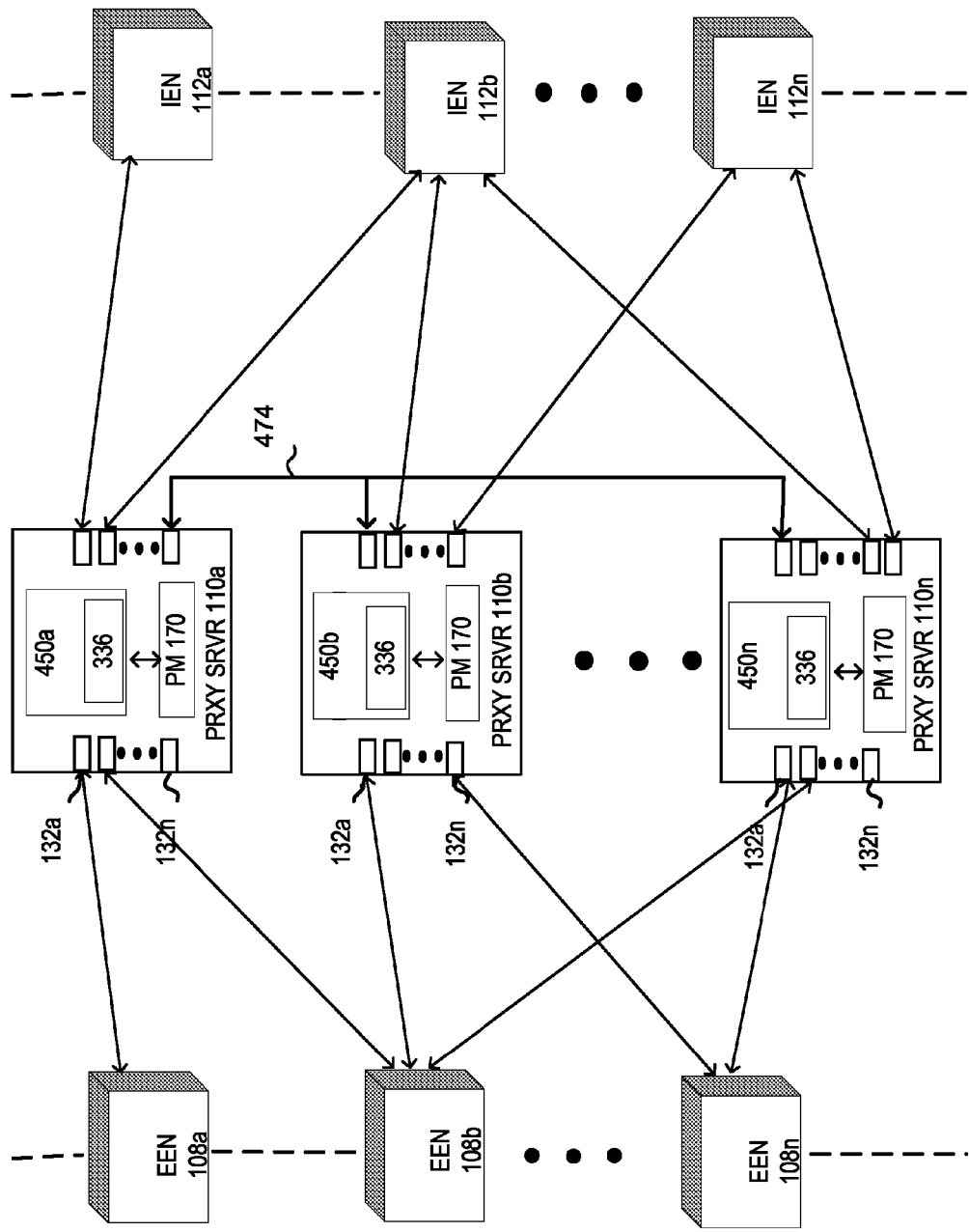
FIG. 12 is a schematic diagram of another embodiment of a network architecture for data communications with high availability and load balancing between an internal network and an external network in accordance with the present invention.

FIG. 12 is a schematic block diagram of an embodiment of clustering proxy servers for load balancing and high availability in accordance with the present invention. In the embodiment of FIG. 12, each of the plurality of proxy servers 110a-n includes a cluster management module 450a-n. The cluster management modules 450a-n maintain a status or list of the available proxy servers 336 in the cluster. The cluster management modules 450a-n are operable to communicate over a network 474 connecting the plurality of proxy servers 110a-n.

Figure 13:
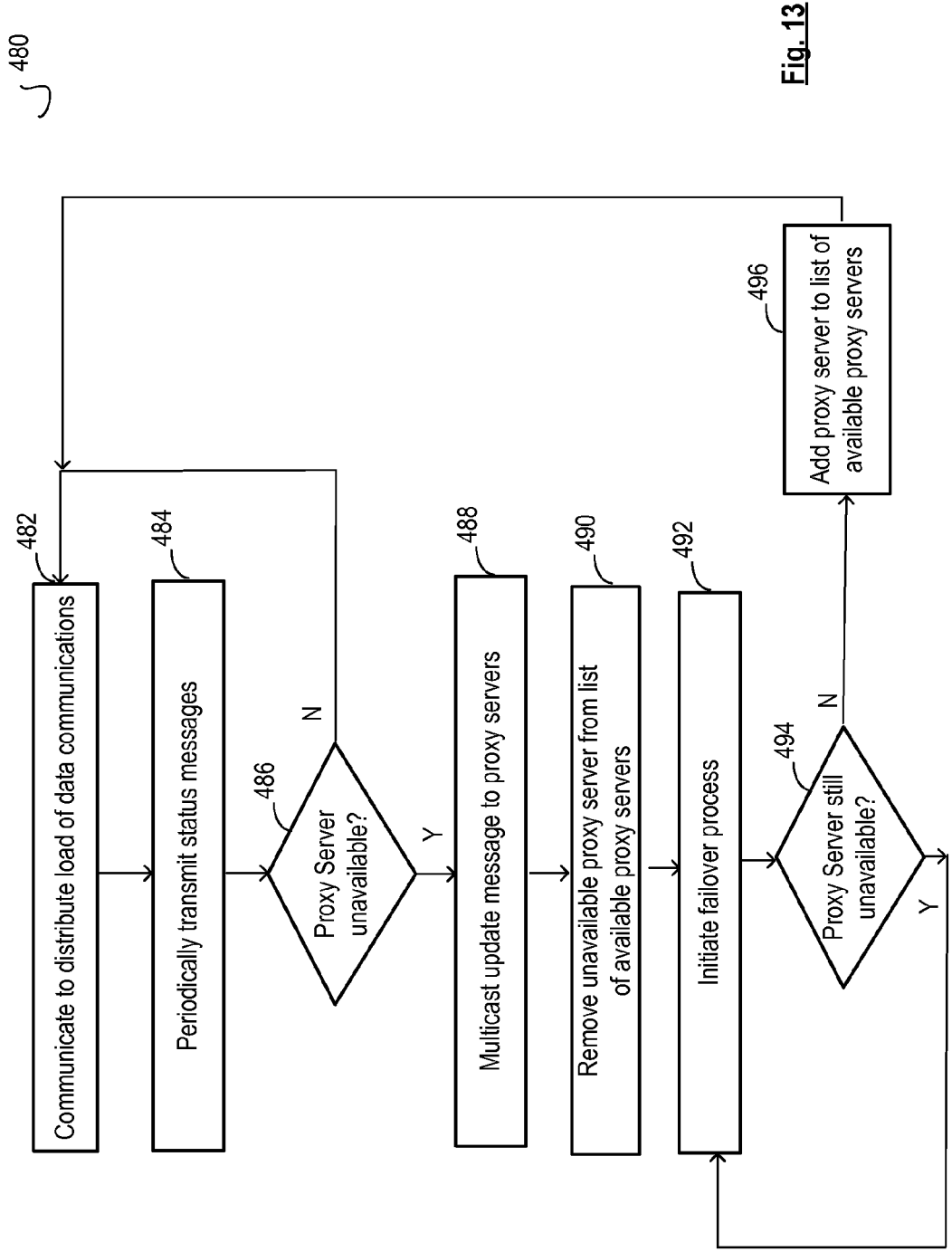
FIG. 13 is a logic diagram of another embodiment of a method for data communications with high availability and load balancing between an internal network and an external network in accordance with the present invention.

FIG. 13 is a logic block diagram of an embodiment of a method 480 for clustering proxy servers operable to provide load balancing and high availability in accordance with the present invention. In operation, the cluster management modules 450a-n communicate to distribute the load of data communications between the available proxy servers 110a-n in the cluster, as shown in step 482. The cluster management modules 450a-n periodically transmit status messages, such as heartbeats, to other cluster manager modules 450a-n to detect any failures in the plurality of proxy servers 110a-n as shown in step 484. In step 486, a cluster management module 450 determines whether one of the proxy servers has become unavailable. The determination may be in response to a communication failure with the proxy server for a time period or other indications. When a cluster management module 450 detects another proxy server is unavailable, it multicasts an update message to the other proxy servers, as shown in step 488. Each proxy server updates their list of available proxy servers 336 to remove the unavailable proxy server, as shown in step 490. Thus, when one of the plurality of proxy servers 110a-n fails to respond, the proxy server is removed from the cluster and the list of available proxy servers 336 in each cluster management module 450a-n. The cluster management modules 450a-n of the remaining available proxy servers then initiate a failover process, as shown in step 492. For example, when a proxy server 110 becomes unavailable, data communications handled by the proxy server are redirected to one or more available proxy servers in the cluster. When it is determined that a proxy server becomes available again in step 494, the cluster management modules 450a-n add the proxy server 110 to the list of available proxy servers 336 as shown in step 496 and resource groups are moved back to the available proxy server.

The network architecture and methods in accordance with the embodiments of the present invention provide high availability and security for data communications between a secure internal network and an unsecure external network. The data security helps protect the internal network from unauthorized data transfers and intrusions.

The processing module 170, 184, 350 and 358 in the various devices described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have internal memory and/or is coupled to an external memory. The internal or external memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or external memory stores, and the processing module 170, 184, 350 and 358 in the various devices executes, hard coded and/or operational instructions corresponding to at least some of the steps and/or functions illustrated in FIGS. 1-13 with respect to its corresponding device.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may still further be used herein, the term "associated with", includes direct and/or indirect association of separate data and/or one data being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

As may be used herein, the term "substantially" provides an industry-accepted tolerance for its corresponding term and/or relativity between items. As may also be used herein, the term(s) "connected to" and/or "connecting" includes direct connection between items and/or indirect connection between items via an intervening item (e.g., an item includes, but is not limited to, a component, an element, a circuit, an interface, a module, a node, a network, etc.).

What is claimed is:

1. A method for secure data communications, comprising:
receiving an indication of a data communication from a device in an external network to a perimeter network, wherein the perimeter network includes one or more external edge nodes, one or more internal edge nodes and a plurality of proxy servers connected between the one or more external edge nodes and the one or more internal edge nodes;
selecting one of the plurality of proxy servers to receive the data communication via a first secure connection, wherein each of the plurality of proxy servers in the plurality of proxy servers is configured with configuration information such that the device connected to the external network is unable to discern said proxy server from the other of said plurality of proxy servers;
receiving a portion of the data communication over the first secure connection via the one or more external edge nodes and the selected proxy server;
establishing a second secure connection between the selected proxy server and an internal network, wherein establishing the second secure connection comprises providing the associated configuration information by the selected proxy server to the internal network via the one or more internal edge nodes;
transmitting the portion of the data communication from the selected proxy server to the internal network over the second secure connection;
determining that the selected proxy server is unavailable;
selecting another proxy server of the plurality of proxy servers to receive a remaining portion of the data communication over the first secure connection; and
transmitting the remaining portion of the data communication from the another proxy server to the internal network over the second secure connection,
wherein the configuration information includes a digital certificate in each of the plurality of proxy servers and wherein the method further comprises
when the first secure connection or the second secure connection is not successfully established, determining whether one of the plurality of proxy servers is unavailable;
when one of the plurality of proxy servers is unavailable, removing the unavailable proxy server from a list of available proxy servers; and
establishing the first secure connection or the second secure connection with one of the plurality of proxy servers on the list of available proxy servers.

2. The method of claim 1, wherein selecting one of the plurality proxy servers to receive the data communication via the first secure connection comprises:
selecting one of a plurality of proxy servers to receive the data communication based on a list of available proxy servers for load balancing and a load balancing algorithm between the plurality of proxy servers.

3. The method of claim 2, further comprising:
maintaining the list of available proxy servers for load balancing; and
when one of the plurality of proxy servers becomes unavailable, removing the unavailable proxy server from the list of available proxy servers for load balancing.

4. The method of claim 3, wherein each of the one or more external edge nodes maintains the list of available proxy servers for load balancing and selects one of the plurality of proxy servers to receive the data communication based on the list of available proxy servers for load balancing and a load balancing algorithm.

5. The method of claim 3, wherein one or more load balancing nodes connected between the one or more external edge nodes and the plurality of proxy servers maintains the list of available proxy servers for load balancing and selects one of the plurality of proxy servers to receive the data communication based on the list of available proxy servers for load balancing and a load balancing algorithm.

6. The method of claim 3, wherein each of the plurality of proxy servers includes a cluster management module that maintains the list of available proxy servers for load balancing and selects one of the plurality of proxy servers to receive the data communication based on the list of available proxy servers for load balancing and a load balancing algorithm.

7. The method of claim 1 wherein the first secure connection is formed using a secure connection protocol that includes encryption.

8. The method of claim 7 wherein the configuration information further comprises an identity of the proxy server forming the first secure connection and the proxy server's public encryption key.

9. The method of claim 1 wherein the second secure connection is established using a secure connection protocol with mutual authentication and encryption.

10. The method of claim 9, further comprising:
monitoring the status of an unavailable proxy server; and
adding the proxy server back to the list of available proxy servers when the proxy server becomes available again.

11. A network system, comprising:
one or more external edge nodes connected to an external network;
one or more internal edge nodes connected to an internal network; and
a plurality of proxy servers connected between the external edge nodes and the internal edge nodes, wherein the system is configured to:
receive an indication of a data communication from a device in the external network to a perimeter network, wherein the perimeter network includes the one or more external edge nodes, the one or more internal edge nodes and the plurality of proxy servers connected between the one or more external edge nodes and the one or more internal edge nodes;
select one of the plurality of proxy servers to receive the data communication via a first secure connection, wherein each of the plurality of proxy servers in the plurality of proxy servers is configured with configuration information such that the device connected to the external network is unable to discern said proxy server from the other of said plurality of proxy servers;
establish the first secure connection between the selected proxy server and the external network, wherein establishing the first secure connection comprises identifying the selected proxy server to the external network by providing the associated configuration information to the external network via the one or more external edge nodes;
receive a portion of the data communication over the first secure connection via the one or more external edge nodes and the selected proxy server;
establish a second secure connection between the selected proxy server and an internal network, wherein establishing the second secure connection comprises providing the associated configuration information by the selected proxy server to the internal network via the one or more internal edge nodes;
transmit the portion of the data communication from the selected proxy server to the internal network over the second secure connection;
determine that the selected proxy server is unavailable during receiving at least the portion of the data communication over the first secure connection;
select another proxy server of the plurality of proxy servers to receive a remaining portion of the data communication over the first secure connection; and
transmit the remaining portion of the data communication from the another proxy server to the internal network over the second secure connection,
wherein the configuration information includes a digital certificate in each of the plurality of proxy servers and wherein the system is further configured to:
when the first secure connection or the second secure connection is not successfully established, determine whether one of the plurality of proxy servers is unavailable;
when one of the plurality of proxy servers is unavailable, remove the unavailable proxy server from a list of available proxy servers; and
establish the first secure connection or the second secure connection with one of the plurality of proxy servers on the list of available proxy servers.

12. The network system of claim 11, wherein each of the one or more external edge nodes is configured to maintain a list of available proxy servers for load balancing and to select one of the plurality of proxy servers to receive the data communications over the first secure connection based on the list of available proxy servers for load balancing and a load balancing algorithm.

13. The network system of claim 12, wherein each of the one or more external edge nodes is operable to monitor the status of the plurality of proxy servers and, when one of the plurality of proxy servers becomes unavailable, to remove the unavailable proxy server from the list of available proxy servers for load balancing.

14. The network system of claim 13, wherein each of the one or more internal edge nodes is configured to maintain a list of available proxy servers for load balancing and to select one of the plurality of proxy servers to receive the data communications over the second secure connection based on the list of available proxy servers for load balancing and a load balancing algorithm.

15. The network system of claim 11, further comprising:
a first one or more load balancing nodes connected between the one or more external edge nodes and the plurality of proxy servers, wherein the first one or more load balancing nodes are configured to maintain a list of available proxy servers for load balancing and to select one of the plurality of proxy servers to receive the data communications over the first secure connection based on the list of available proxy servers for load balancing and a load balancing algorithm.

16. The network system of claim 15, further comprising:
a second one or more load balancing nodes connected between the plurality of proxy servers and the one or more internal edge nodes, wherein the second one or more load balancing nodes are configured to maintain a list of available proxy servers for load balancing and to select one of the plurality of proxy servers to receive the data communications over the second secure connection based on the list of available proxy servers for load balancing and a load balancing algorithm.

17. The network system of claim 11, wherein each of the plurality of proxy servers includes a cluster management module that maintains a list of available proxy servers and selects one of the plurality of proxy servers to receive data communications based on the list of available proxy servers.

18. The network system of claim 11, further comprising:
a management server connected to the plurality of proxy servers, wherein the management server is operable to configure each of the plurality of proxy servers with the configuration information for establishing the first and second secure connections.

19. The network system of claim 18, wherein the management server includes:
   a configuration database that stores the configuration information for each of the plurality of proxy servers; and
   a directory database of authorized users of the internal network.

20. The network system of claim 19 wherein the management server provides audit trails and reports on the secure communications with the plurality of proxy servers.

21. The network system of claim 18 wherein the selected proxy server provides status indications relating to the first and second secure connections to the management server.

* * * * *